United States Patent [19]

Suzuki et al.

[11] 4,384,815
[45] May 24, 1983

[54] SPARE TIRE HANGER

[75] Inventors: Hiroyuki Suzuki, Fujisawa; Hideyori Sakuragi, Yokosuka, both of Japan

[73] Assignee: Nissan Motor Co., Ltd., Yokohama, Japan

[21] Appl. No.: 132,021

[22] Filed: Mar. 20, 1980

[30] Foreign Application Priority Data

Mar. 29, 1979 [JP] Japan .................. 54-40891[U]

[51] Int. Cl.³ .................................. B62D 43/00
[52] U.S. Cl. ........................... 414/466; 224/42.23
[58] Field of Search ............ 296/37.2; 414/463, 466; 224/42.12, 42.21, 42.23; 76/114; 81/121 R

[56] References Cited

U.S. PATENT DOCUMENTS

| | | | |
|---|---|---|---|
| 2,777,591 | 1/1957 | Madzatuik | 414/463 |
| 3,175,742 | 3/1965 | Cadmus | 414/463 |
| 3,376,768 | 4/1968 | Fortunato | 81/121 R |
| 4,093,088 | 6/1978 | Hildebrandt et al. | 414/463 |
| 4,221,312 | 9/1980 | Wertjes | 414/466 |

FOREIGN PATENT DOCUMENTS 2758687 8/1979 Fed. Rep. of Germany ... 224/42.23

Primary Examiner—Joseph F. Peters, Jr.
Assistant Examiner—Ross Weaver
Attorney, Agent, or Firm—James Creighton Wray; Craig B. Bailey

[57] ABSTRACT

The disclosed spare tire hanger comprises a main member for holding a spare tire substantially horizontally below a vehicle, which main member has one end thereof swingably secured to the vehicle and a connector secured to a free end thereof, and a holding rod depending from the vehicle and adapted to be disengageably connected to said connector of the main member at lower end thereof, wherein the connector has a portion engageable with a wheel wrench or a like tool.

3 Claims, 7 Drawing Figures

SPARE TIRE HANGER

BACKGROUND OF THE INVENTION

1. Field of the Invention

This invention relates to a hold-up type spare tire hanger.

2. Description of the Prior Art

A typical spare tire hanger of hold-up type of the prior art comprises a main member for holding a spare tire substantially horizontally below the body of a vehicle, which main member has one end thereof swingably secured to the vehicle and the opposite end thereof left free, a connector secured to the free end of the main member, and a holding rod depending from the vehicle and adapted to be detachably connected to said connector of the main member at lower end thereof.

The spare tire hanger of the prior art with the aforesaid construction has shortcomings in that the process of mounting and dismounting a spare tire relative to the spare tire hanger requires much muscular strength and that such process requires one to assume a highly unusual posture which may cause soiling of his clothes.

SUMMARY OF THE INVENTION

Thus, an object of the present invention is to obviate the aforesaid shortcomings of the prior art techniques, by providing a spare tire hanger whose main member can be easily swung upwardly and downwardly by using a wheel wrench or a similar tool normally provided in a vehicle at the time of replacing a spare tire. According to the present invention, there is provided a spare tire hanger comprising a main member for holding a spare tire substantially horizontally below a vehicle, said main member having one end thereof swingably secured to the vehicle and an opposite end thereof left movable, a connector secured to the movable end of the main member, and a holding rod depending from the vehicle and adapted to be disengageably connected to said connector, wherein the connector has a portion engageable with a wheel wrench or a like tool.

BRIEF DESCRIPTION OF THE DRAWING

For a better understanding of the invention, reference is made to the accompanying drawing, in which.

DESCRIPTION OF THE PREFERRED EMBODIMENTS

Figure 1:
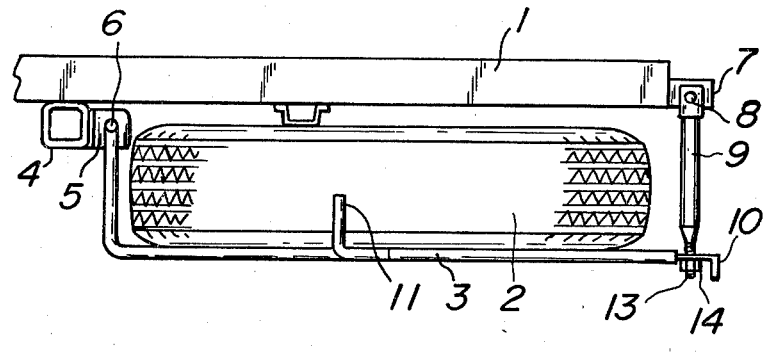
FIG. 1 is a side view of a conventional spare tire hanger.
Figure 2:
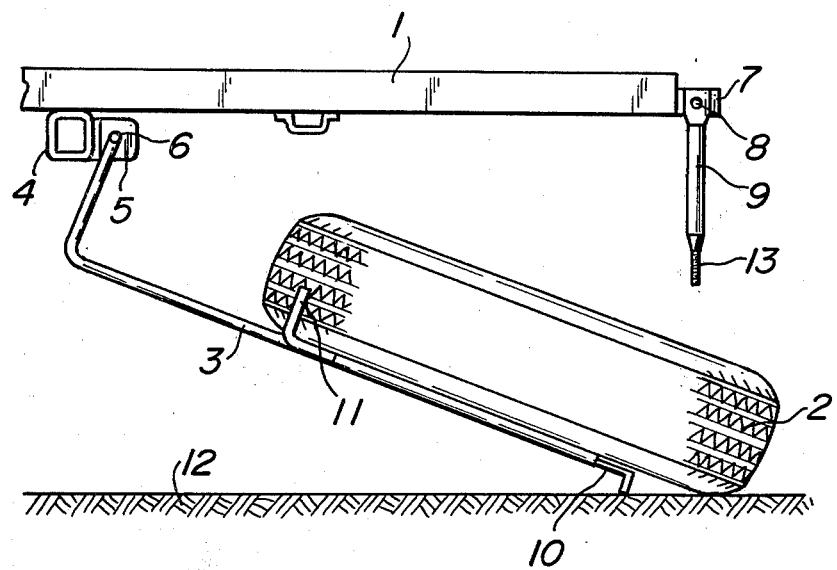
FIG. 2 is an explanatory view showing the manner in which the spare tire hanger of FIG. 1 is operated for replacement of a tire.
Figure 3:
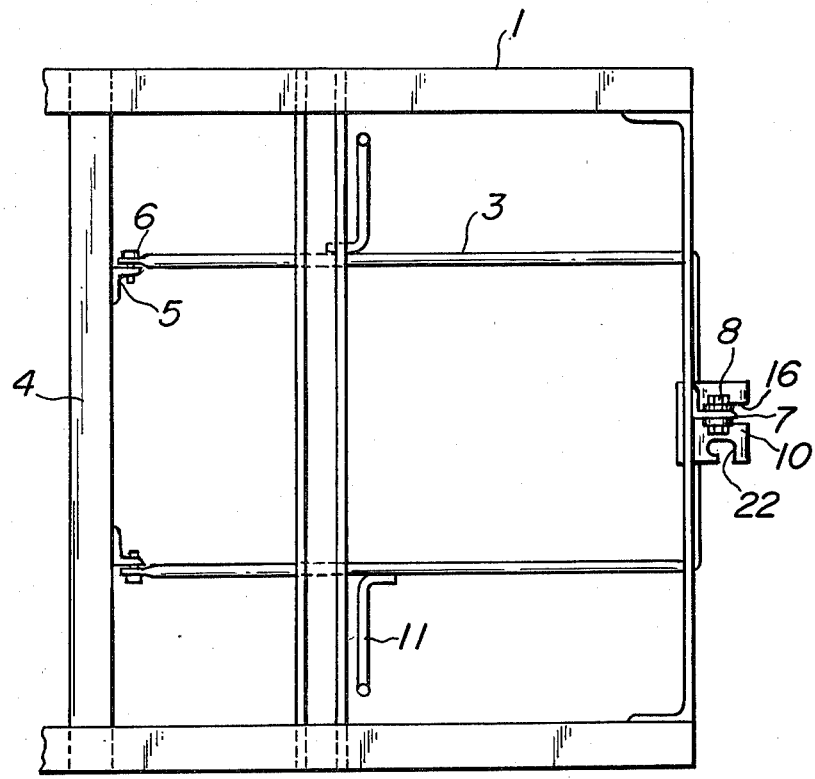
FIG. 3 is a plan view of a spare tire hanger according to the present invention.

Before entering the details of the present invention, the construction of a spare tire hanger of the prior art will be briefly reviewed. Referring to FIGS. 1 and 2, a hold-up type spare tire hanger of the prior art comprises a spare tire hanger main member 3 made by suitably shaping pipes or the like so as to hold a spare tire 2 substantially horizontally under a vehicle chassis frame 1, and one end of the main member 3 is pivotally connected to a bracket 5 by a pin 6, which bracket is secured to a cross member 4 disposed at the rear portion of the vehicle chassis frame 1. Another bracket 7 is secured to the rear end of the chassis, and the upper end of a holding rod 9 is rotatably connected to the bracket 7 by a pin 8, and the lower end of the thus suspended holding rod 9 is detachably connected to a connector 10 secured to the free end of the main member 3. When the lower end of the holding rod 9 is disengaged from the connector 10, the hanger main member 3 can swing about the pin 6, and the free end of the member 3 can move downward. Side stoppers 11 extend upward at opposing side portions of the hanger main member 3.

In the spare tire hanger of the prior art having the aforesaid construction, to replace a spare tire, the connection between the connector 10 of the main member 3 and the holding rod 9 is at first released, and the free end of the hanger main member 3 is lowered by hand until the connector 10 comes to rest on the ground surface 12, as shown in FIG. 2, so as to remove the spare tire hung by the main member. To store a spare tire 2, it is pushed into the inclined hanger main member 3, and the free end of the member 3 is raised by hand and the connector 10 is brought into engagement with the lower end of the holding rod 9. Then, a nut 14 is screwed onto a threaded portion 13 at the lower end of the holding rod 9, for tight connection between the connector 10 and the holding rod 9. Accordingly, to replace a spare tire, much muscular strength is required for removing and inserting it relative to the main member, especially when the tire is large and heavy. If the manually operable portion of the hanger main member 3 is located under the vehicle body at a position with a considerable distance from the peripheral edge of the body, an operator for tire replacement has to assume a usual posture with his knees on the ground for holding the member by two arms, and his clothes are exposed to soiling.

The present invention intends to obviate the aforesaid inconveniences or shortcomings of the prior art techniques.

The invention will now be described by referring to FIGS. 3 to 7. In an embodiment shown in FIGS. 3 to 6, 1 is a chassis frame, 3 is a spare tire hanger main member, and a bracket 5 is secured to a cross member 4 at the rear end portion of the chassis frame 1 and one end of the main member 3 is swingably secured to the bracket 5 by a pin 6 under the chassis frame 1. The upper end of a holding rod 9 is rotatably secured to a bracket 7 at the rear end of the chassis frame 1 by a pin 8, and the lower end of the holding rod 9 is adapted to disengageably hold the free end of the main member 3. A connector 10 is fixed to the free end of the hanger main member 3 by welding or other suitable fixing means.

Figure 4:
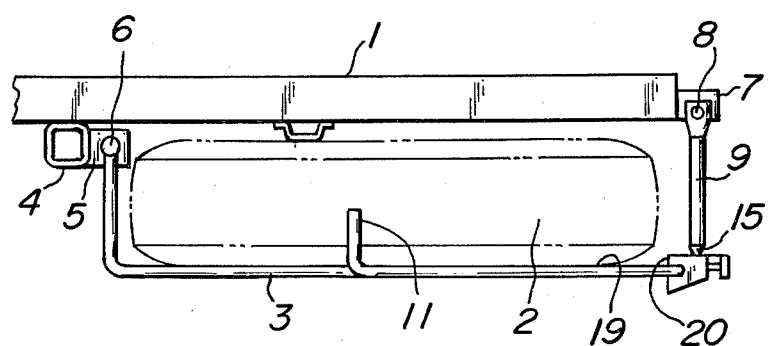
FIG. 4 is a side view of the spare tire hanger of FIG. 3.
Figure 5:
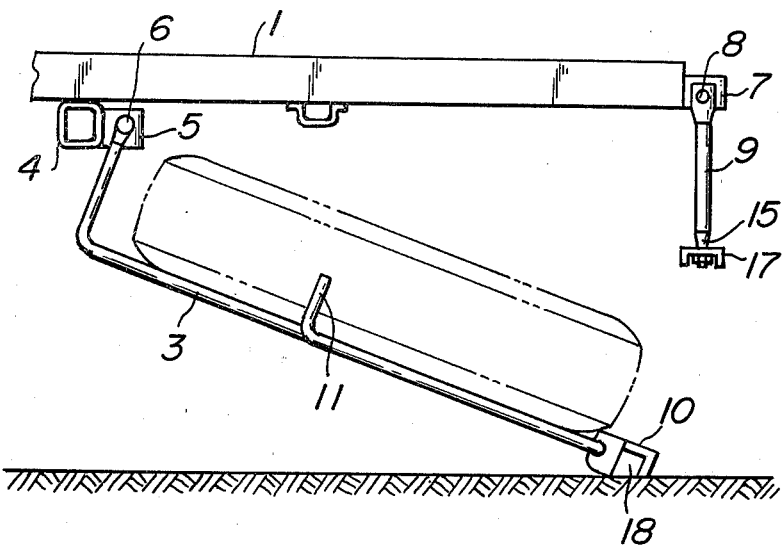
FIG. 5 is an explanatory view showing the manner in which the space tire hanger of FIG. 4 is operated for replacement of a tire.
Figure 6:
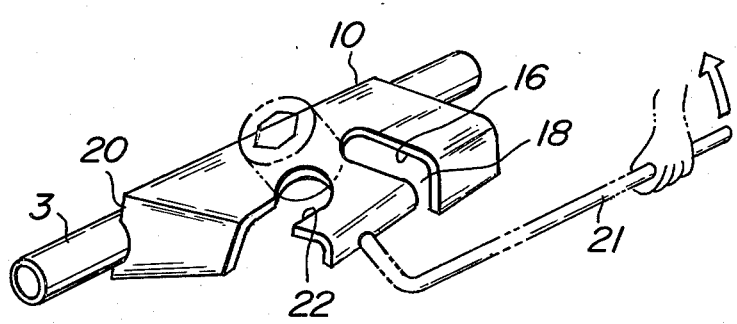
FIG. 6 is a schematic perspective view of a connector of FIG. 3, shown on a larger scale.

As can be seen from the figures, the connector 10 has a slot 16 in which the lower end reduced-diameter portion 15 of the holding rod 9 can be inserted. A latch member 17 is fixed to the lower end of the holding rod 9 in such a manner that, when the reduced-diameter portion 15 is inserted in the slot 16 of the connector 10, the latch member 17 is fitted in the lower hollow space 18 of the connector 10 with the outer surface of the latch member in contact with the inner surface of the connector 10 for preventing accidental unlatching. As shown in FIGS. 4 and 6, the connector 10 is provided with a stopper surface 20 extending above a spare tire holding surface 19 of the hanger main member 3, so that when the hanger main member 3 is released from the holding rod 9 as shown in FIG. 5, the spare tire 2 on the spare tire holding surface 19 of the hanger main member 3 is prevented from sliding down over the connector 10.

Besides, the connector 10 is provided with a notch 22 for receiving a wheel wrench 21 as shown in FIG. 6, so that when it is desired to vertically swing the hanger main member 3 for replacing a spare tire, one end of the wheel wrench 21 is inserted in the notch 22 and the operator can operate the main member 3 while holding the opposite end of the wheel wrench 21 by hand.

With the aforesaid construction according to the present invention, the moment arm from the center of gravity of the spare tire to the operating point (representing the gripped portion of the wheel wrench) becomes long, and accordingly, the required operating force becomes smaller. Furthermore, the use of the wheel wrench 21 makes it possible to raise or lower the connector from the outside of the vehicle body, which connector may be located inside the peripheral edge of the vehicle body, so that the operator can work on the spare tire hanger with a stable posture.

Figure 7:
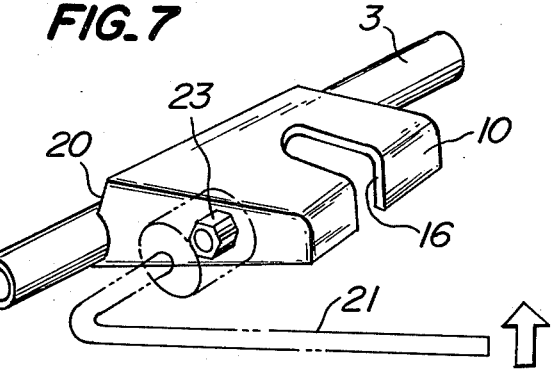
FIG. 7 is a schematic perspective view, similar to FIG. 6, showing another embodiment of the invention on a larger scale.

FIG. 7 illustrates another embodiment of the present invention, wherein a wheel nut 23 is secured to a connector 10 by welding or other suitable securing means, so that a wheel wrench 21 may operatively engage the wheel nut 23. The embodiment of FIG. 7 is operated in the same manner as described hereinbefore by referring to FIG. 6.

The invention has been described by referring to an application thereof to a vehicle having a chassis frame, such as a truck, but the application of the present invention is not restricted such vehicle alone, and for instance, the present invention can be applied to a passenger car which holds a spare tire below the body at a rear portion thereof. In the case of the passenger car, the pivotted end of the spare tire hanger main member can be secured to the body or a reinforcing member of the body.

The spare tire hanger according to the present invention has advantages in that the operating force is smaller than that of the prior art, and that easy tire replacing operation can be ensured even when the connector at the free end of a main member is located deep in the space below a vehicle body as seen from the outer peripheral edge of the vehicle body.

Although the invention has been described with a certain degree of particularly, it is understood that the present disclosure has been made only by way of example and that numerous changes in details of construction and the combination and arrangement of parts may be resorted to without departing from the scope of the invention as hereinafter claimed.

What is claimed is:

1. A spare tire hanger comprising a main member for holding a spare tire substantially horizontally below a vehicle, said main member having one end thereof swingably secured to the vehicle, a connector secured to an opposite end of said main member, and a holding rod depending from the vehicle and adapted to be disengageably connected to said connector of the main member at lower end thereof, said connector having a generally horizontal portion provided with a transverse notch extending from an edge, said notch having a width smaller than a diameter of a wrench head portion of a wheel wrench but larger than a diameter of a shank portion of the wheel wrench, the lower end of said holding rod having a latch member secured thereto, said connector having a hollow space defined therein for disengageably receiving said latch member, said holding rod having a necked-down portion adjacent said latch member and said connector having a slot distinct from said notch, said necked-down portion of the holding rod being fitted in said slot of the connector when said latch member is fitted in the hollow space of the connector.

2. A spare tire hanger as set forth in claim 1, wherein said slot extends longitudinally along the horizontal portion of said connector.

3. A method for manipulating a spare tire hanger having a main member for holding a spare tire substantially horizontally below a vehicle, said main member having one end thereof swingably secured to the vehicle, a connector secured to an opposite end of said main member, and a holding rod depending from the vehicle and adapted to be disengageably connected to said connector of the main member at lower end thereof, said connector having a generally horizontal portion provided with a transverse notch extending from an edge comprising.

inserting a wheel wrench into said notch so that the wrench head portion rests on an upper surface of said horizontal portion, gripping the shank portion of the wheel wrench remote from the wrench head portion, articulating the wrench about a substantially horizontal transverse axis to bring the wrench into abutment with an edge of the connector, and applying sufficient upward force to the wrench at the gripping portion to selectively swing the main member relative to the vehicle.

* * * * *